(12) United States Patent
Jogo

(10) Patent No.: US 6,940,620 B2
(45) Date of Patent: Sep. 6, 2005

(54) IMAGE PROCESSING METHOD TO REDUCE MOIRÉ IN IMAGE

(75) Inventor: Naozumi Jogo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 855 days.

(21) Appl. No.: 09/867,599

(22) Filed: May 31, 2001

(65) Prior Publication Data

US 2001/0050779 A1 Dec. 13, 2001

(30) Foreign Application Priority Data

Jun. 1, 2000 (JP) ........................................ 2000-164387

(51) Int. Cl.⁷ ............................ G06T 5/00; H04N 1/409
(52) U.S. Cl. ........................ 358/3.26; 358/3.27; 382/260
(58) Field of Search ............................... 358/3.26, 3.27, 358/533; 382/260, 263, 264, 275

(56) References Cited

U.S. PATENT DOCUMENTS 5,333,211 A * 7/1994 Kanda et al. ................ 382/261
5,408,337 A * 4/1995 Kanda ........................ 358/447
5,687,006 A * 11/1997 Namizuka et al. .......... 358/462
6,343,138 B1 * 1/2002 Rhoads ....................... 382/100

FOREIGN PATENT DOCUMENTS

| JP | 9-22460 | 1/1997 | ............ G06T/5/00 |
| JP | 9-172600 | 6/1997 | .......... H04N/5/907 |

OTHER PUBLICATIONS

Patent Abstract of Japan, 09–022460, Jan. 21, 1997.
Patent Abstract of Japan, 09–172600, Jun. 30, 1997.

* cited by examiner

Primary Examiner—Thomas D. Lee
(74) Attorney, Agent, or Firm—Sughrue Mion, PLLC

(57) ABSTRACT

Image signals picked up from a reflective original through a reflective scanner (14) are sent to a moiré processing section (46) for eliminating moiré from the image signals. The moiré processing section (46) is provided with a first filter (51) and a second filter (52) that eliminates moiré more than the first filter. The first filter reduces high spatial frequency components of the image and also raises middle spatial frequency components of the image. A selector is provided for selecting the first filter when the original contains characters and grayscale images, or the second filter when the original mainly contains grayscale images. When the original mainly contains characters, both of the first and second filters are not used.

6 Claims, 9 Drawing Sheets

1st MODE
(LPF 48 ALONE)

2nd MODE
(WITH 1st FILTER)

3rd MODE
(WITH 2nd FILTER)

IMAGE PROCESSING METHOD TO REDUCE MOIRÉ IN IMAGE

BACKGROUND OF THE INVENTION

1. Field of the Invention

The present invention relates an image processing method for processing an electronic image that is picked up from an original, so as to reduce moiré in the image.

2. Background Arts

An imaging system has been known in the art, that consists of image input devices, including a scanner, an electronic still camera or so-called digital camera and a memory reader, a personal computer and a digital printer. An electronic image entered through the image input device into the personal computer is processed synthesizing the image by use of a template or changing the magnification of the image. Based on the processed image data, the digital printer prints a hard copy of the image on a recording paper. As the digital printer, there are a silver halide photography type, a heat developing photosensitive material type, a thermal recording type, an ink jet type and so forth.

The reflective scanner projects light onto an original, such as a printed matter and a photo-print, and picks up reflected light from the original through a line sensor, to output an image signal. The line sensor consists of a large number of photoelectric sensor cells arranged at a regular spacing. It is known in the art that an image printed based on the image data from the reflective scanner sometimes contains moiré, and that the moiré is caused by a ratio of a spatial frequency of the image and a sampling frequency that is determined by the spacing between the photoelectric sensor cells.

The original may have a grayscale image and/or a text printed thereon, and the moiré will be more conspicuous in those portions of the image where there are fine grayscale patterns, and thus the spatial frequency is high. For this reason, it is conventional to use a low pass filter (LPF) through which gains of the picked up image signals are reduced in a higher spatial frequency band, for reducing the moiré in the reproduced image.

However, the conventional low pass filter reduces not only the high spatial frequency band but also middle and low spatial frequency bands, so that the sharpness is lowered in the portions of middle and low spatial frequencies, that is, the portions containing binary images, such as characters, letters, marks or lines. Hereinafter, these portions of middle and low spatial frequencies will be referred to as "characters" for the sake of avoiding redundancy. In order to avoid lowering the sharpness of the characters, it has been necessary to adjust characteristic curves of the low pass filter finely according to the content of the original. Such fine-adjustment of the low pass filter characteristic curves is so difficult that it requires a skill.

SUMMARY OF THE INVENTION

In view of the foregoing, an object of the present invention is to provide an image processing method that allows anyone to reduce the moiré with ease.

Another object of the present invention is to provide an image processing method for an original containing a grayscale image and a text, that makes it possible to reduce the moiré in the grayscale image without lowering the image quality of characters in the text.

According to the present invention, an image processing method for processing an electronic image that is picked up from an original comprises the steps of selecting, in accordance with content of the original, one of a plurality of filters having different moiré-eliminating characteristics from each other; and filtering the image through the selected filter.

Selecting a suitable filter from among different filters in accordance with the content of the original is much easier than fine-adjustment of characteristic curves of a single low pass filter.

According to a preferred embodiment, at least a first filter and a second filter that eliminates moiré more than the first filter are prepared, and the first filter reduces high spatial frequency components of the image and also raises middle spatial frequency components of the image. The first filter is selected when the original contains characters and grayscale images, whereas the second filter is selected when the original mainly contains grayscale images.

Because the image is filtered through the first filter that reduces high spatial frequency components of the image and also raises middle spatial frequency components of the image when the original contains characters and grayscale images, the moiré in the grayscale images is sufficiently reduced without lowering the sharpness of the characters.

According to another aspect of the present invention, one of a plurality of filters that eliminate moiré to different degrees is automatically selected by entering data on content of said original from which said image is picked up.

According to a further aspect of the present invention, one of a plurality of filters that eliminate moiré to different degrees is automatically selected by entering data on the type of said original from which said image is picked up.

Both of these configurations make it easier to select an optimum filter for the original.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
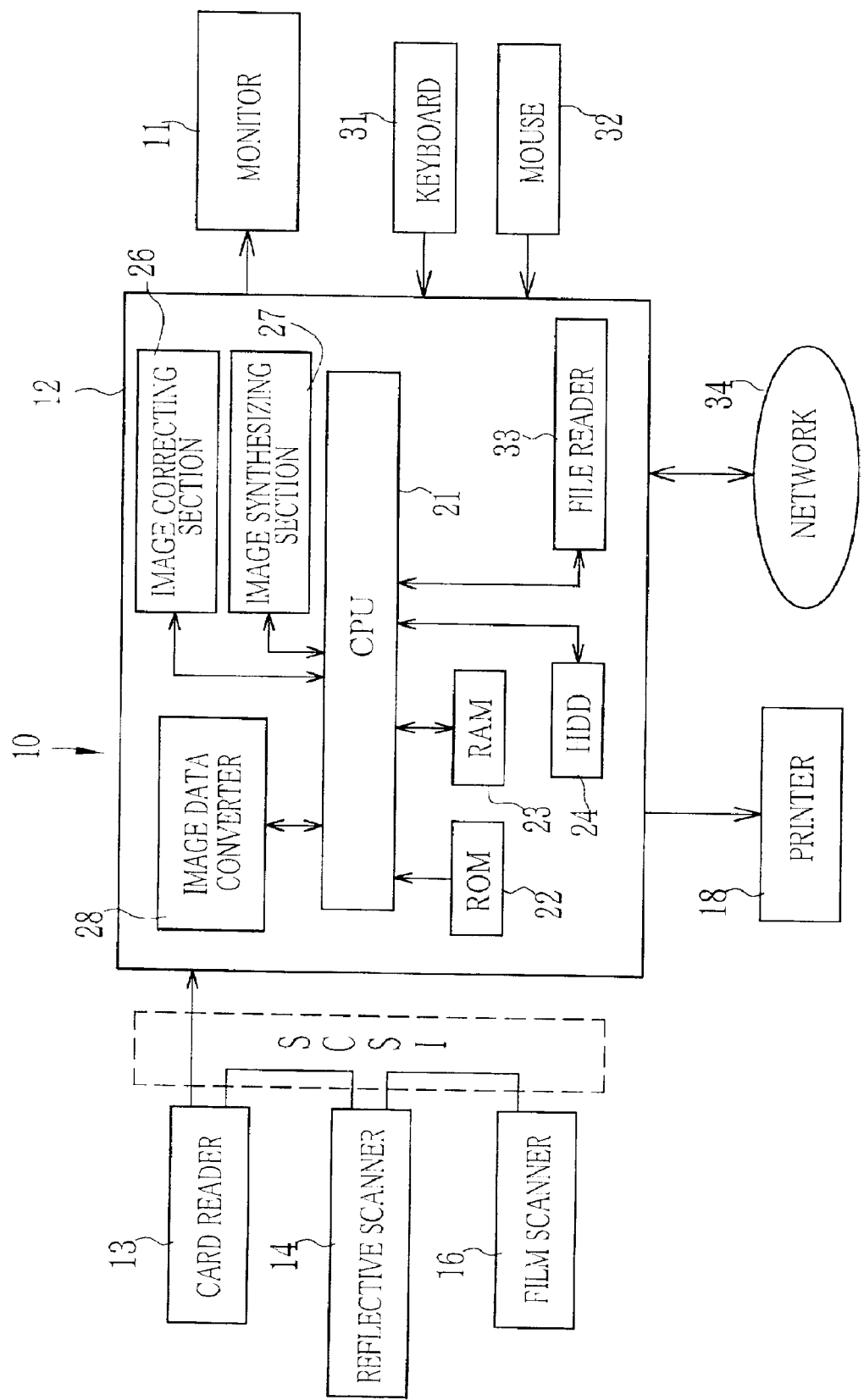
FIG. 1 is a block diagram illustrating an imaging system according to an embodiment of the present invention.

An imaging system 10 shown in FIG. 1 consists of a personal computer 12 with a monitor 11, image input devices, and a printer 18. The image input devices include a card reader 13, a reflective scanner 14 and a film scanner 16, which are connected in cascade to the personal computer 12 through a SCSI interface. The printer 18 prints an image on a recording paper based on image data input through any of the image input devices, after the image data is processed in the personal computer 12. Thus, the printer 18 constitutes an image output device.

The card reader 13 reads out image data from a storage card, such as a Smart Media (a trade name), that is loaded in the card reader 13. The image data written on the storage card has been picked up through an imaging device, such as an electronic still camera.

The reflective scanner 14 projects light onto an original that does not transmit light but reflect light, such as a printed matter or a photography printed on an opaque recording material, and receives light reflected from the original on a line sensor, to output photoelectric signals to the personal computer 12.

In this embodiment, the printer 18 is of a heat developing photosensitive material type, wherein a photosensitive material is exposed to three-color laser beams to have a latent image recorded thereon, and is mated with an image receiving material. By heating these materials together, the image on the photosensitive material is transferred as a positive image to the image receiving material. Thereafter, the image receiving material is peeled off to be a photo-print.

The personal computer 12 consists of a CPU 21, a ROM 22, a RAM 23, a hard disc drive (HDD) 24, an image correcting section 26, an image synthesizing section 27 and an image data converter 28. To the personal computer 12 is connected a keyboard 31 and a mouse 32, for giving various commands to the personal computer 12. A file reader 33, e.g. a floppy disc drive, is built in the personal computer 12, for reading image data files from a storage medium, such as a floppy disc. The 12 is connected to a network, such as a LAN (Local Area Network) or the Internet, for communicating image data.

The image synthesizing section 27 changes the magnification of the image to enlarge or reduce the frame size of the image, or synthesizes a plurality of images into a frame for printing the synthesized image on a sheet of recording paper. Before being processed in the image synthesizing section 27, the image data is processed in the image correcting section 26 in a manner as set forth in detail below.

In the image data converter 28, the image data is subjected to γ-conversion considering spectral characteristics of the image input device, such as the electronic still camera, that is used for inputting the image data, and color conversion from blue, green and red (B, G, R) to yellow, magenta and cyan (Y, M, C), called masking. The converted image data is written on the RAM 23.

On picking up image data through the film scanner 16, a pre-scanning is first carried out at a rough scanning frequency for setting up conditions of the film scanner 16 and, thereafter, a main scanning is carried out at a fine scanning frequency. The image data picked up through the pre-scanning is subjected to the γ-conversion in the image data converter 28, and is used for correcting parameters of the film scanner 16. The corrected parameters are sent to an image data converter that is built in the film scanner 16, so the image data picked up through the main scanning is subjected to image conversion processes, including γ-conversion, in the film scanner 16. Therefore, the image data picked up through the main scanning bypasses the image data converter 28, and is sent directly to the RAM 23.

Figure 2:
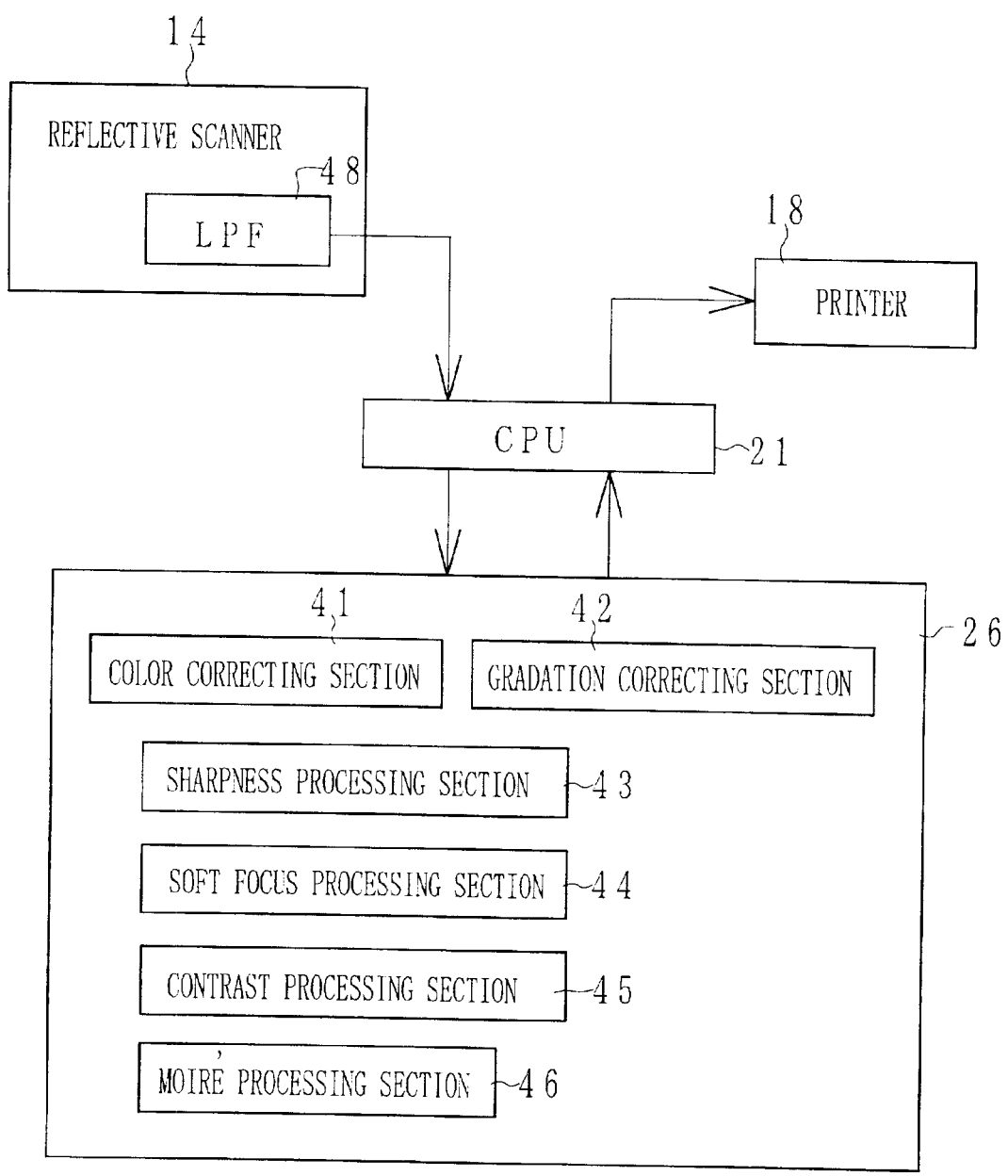
FIG. 2 is a block diagram illustrating an image correcting section of the imaging system.

As shown in FIG. 2, the image correcting section 26 consists of a color correcting section 41, a gradation correcting section 42, a sharpness processing section 43, a soft focus processing section 44, a contrast processing section 45 and a moiré processing section 46.

The color correcting section 41 corrects color balance between blue, green and red (B, G, R) of the image. The gradation correcting section 42 corrects densities of the image. The contrast processing section 45 corrects the contrast of the image.

The sharpness processing section 43 enhances a high spatial frequency band of the image by raising the output from the high spatial frequency band, to increase the sharpness of the image. The soft focus processing section 44 enhances a low spatial frequency band of the image, to blur the image as a whole. For instance, the soft focus processing section 44 enhances the low spatial frequency band by lowering the output from high and middle spatial frequency bands, to produce a blurred image, and then synthesizes the blurred image with the image that is not subjected to the soft focusing process and thus includes the high and middle spatial frequency bands.

The moiré processing section 46 is for eliminating moiré from printed pictures whose image signals are picked up through the reflective scanner 14. The reflective scanner 14 is provided with a low pass filter (LPF) 48 that cuts a little down on high spatial frequency band components of the picked up image signals.

Figure 3:
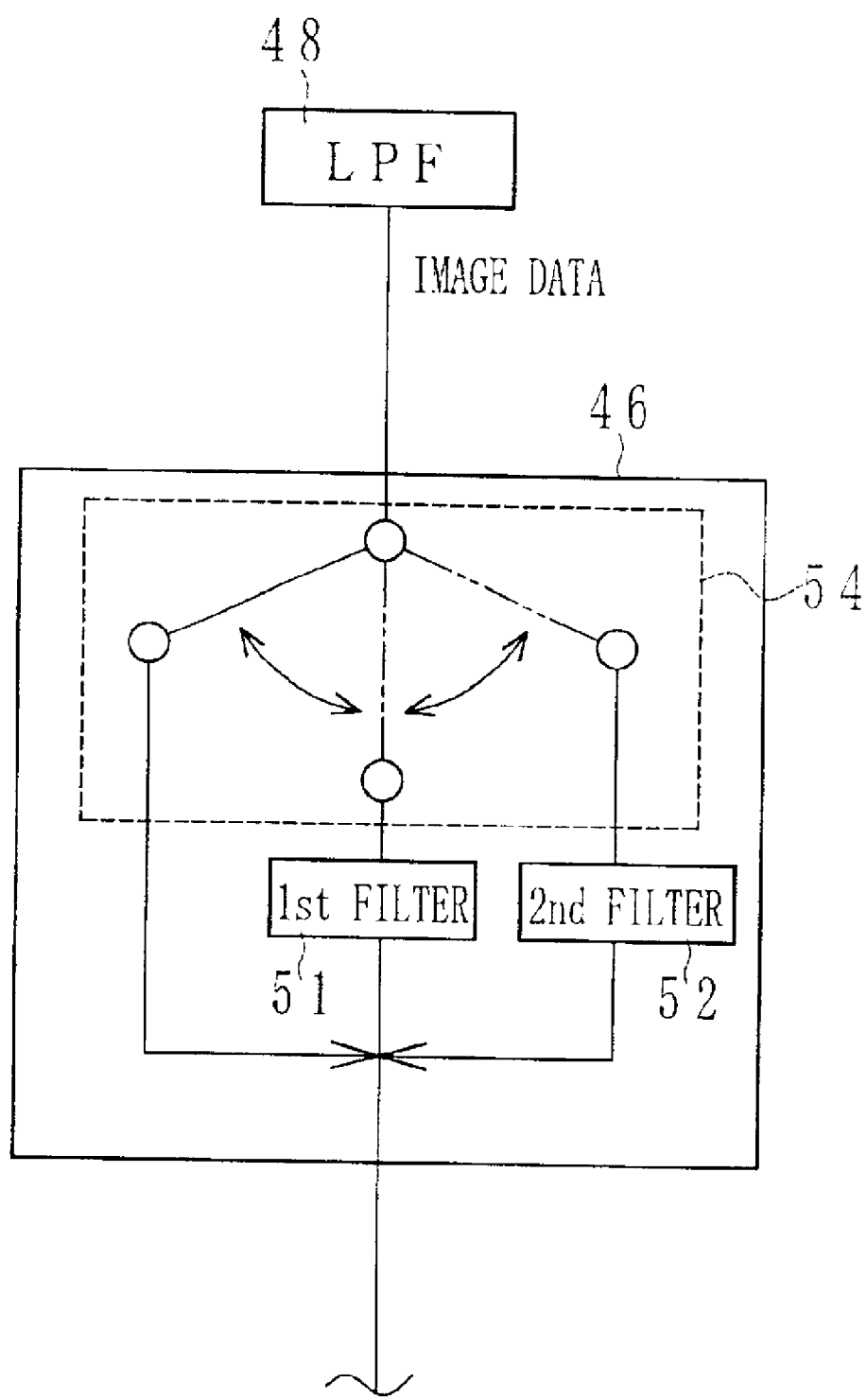
FIG. 3 is an explanatory diagram illustrating a moiré processing section of the image correcting section.

As shown in FIG. 3, the moiré processing section 46 is provided with a first filter 51 and a second filter 52 that are designed to reduce the moiré, but the second filter 52 reduces moiré to larger extent than the first filter 51. There are three modes for the moiré processing, one of which is selected according to the desirable degree of reducing the moiré. A selector 54 is provided for switching between the first to third modes.

The first mode is one where the moiré is least reduced, and neither of the first and second filters 51 and 52 is used. When the first mode is selected, the moiré processing section 46 outputs the image signals as they are input through the low pass filter 48 of the reflective scanner 14. In the second mode, the first filter 51 is selected. In the third mode, the second filter 52 is selected.

Figure 4A:
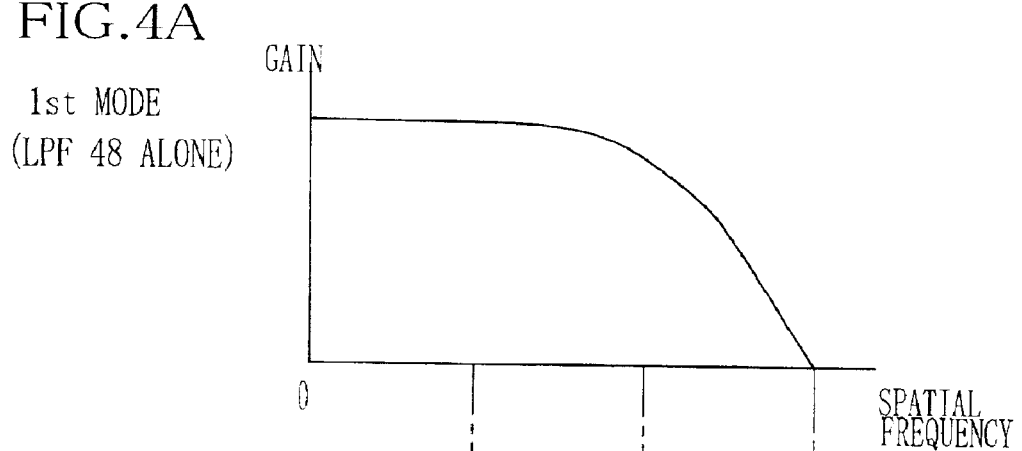
FIGS. 4A, 4B and 4C are graphs illustrating image signals output from the moiré processing section in first to third modes respectively.
Figure 4B:
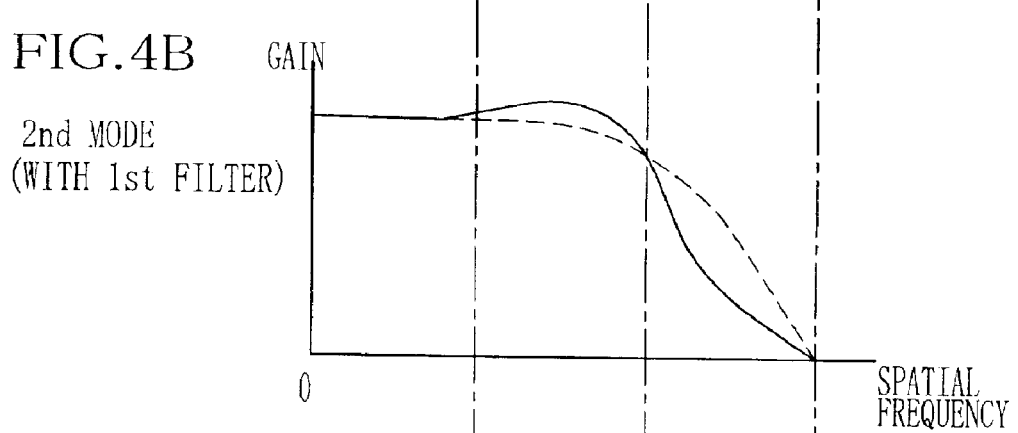
Figure 4C:
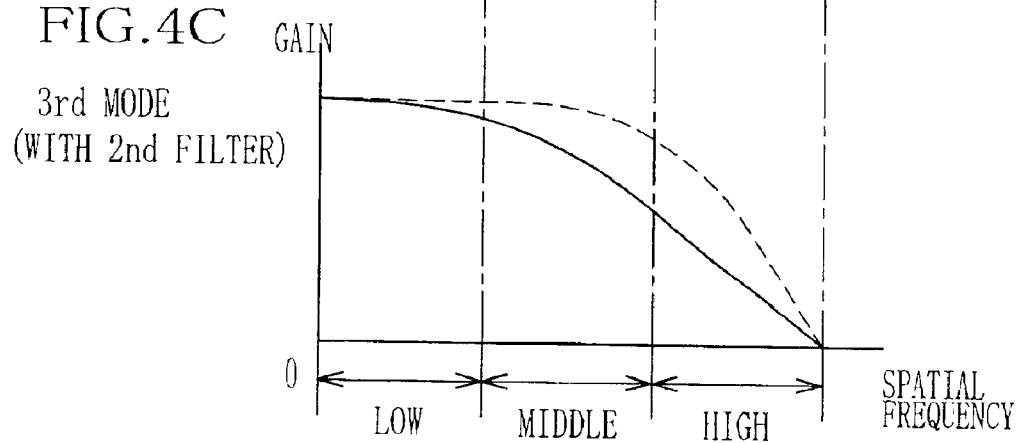

FIGS. 4A, 4B and 4C show the output image signals from the moiré processing section 46 in the first to third modes respectively, wherein the abscissa represents the spatial frequency, and the ordinate represents the gain. The curve shown in FIG. 4A corresponds to the filtering characteristics of the low pass filter 48, whereas the curve shown in FIG. 4B corresponds to the filtering characteristics of the combination of the low pass filter 48 and the first filter 51, and the curve shown in FIG. 4C corresponds to the filtering characteristics of the combination of the low pass filter 48 and the second filter 52. In FIGS. 4B and 4C, the characteristic curve of the low pass filter 48 is shown by dashed lines for reference.

In the first mode, since the loss of gain in the high spatial frequency band is the smallest, the moiré is least reduced. But since the gain is not reduced in the middle and low spatial frequency bands, characters represented by the low and middle spatial frequencies are definitely reproduced.

Therefore, the first mode is selected for those originals which contain characters only, or mainly consists of characters. That is, the first mode is suitable for those cases where the image quality of the characters has the highest priority.

In the second mode, the gain in the high spatial frequency band is reduced more than in the first mode, and the gain in the middle spatial frequency band is increased. In this way, the moiré is reduced more than in the first mode, while preventing characters from blurring. Therefore, the second mode is selected for those originals where grayscale images mingle with characters.

Figure 5:
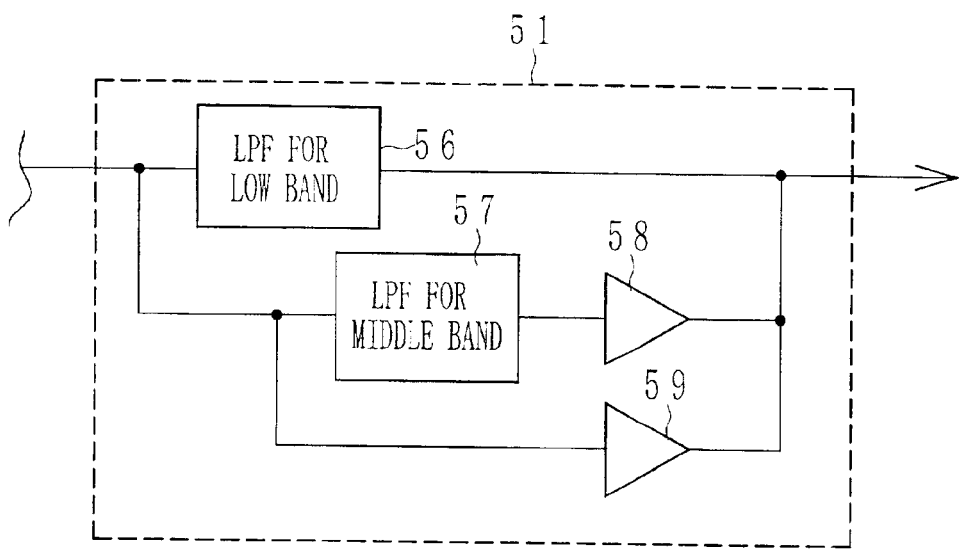
FIG. 5 is a block diagram illustrating a first filter provided in the moiré processing section of FIG. 3.
Figure 6:
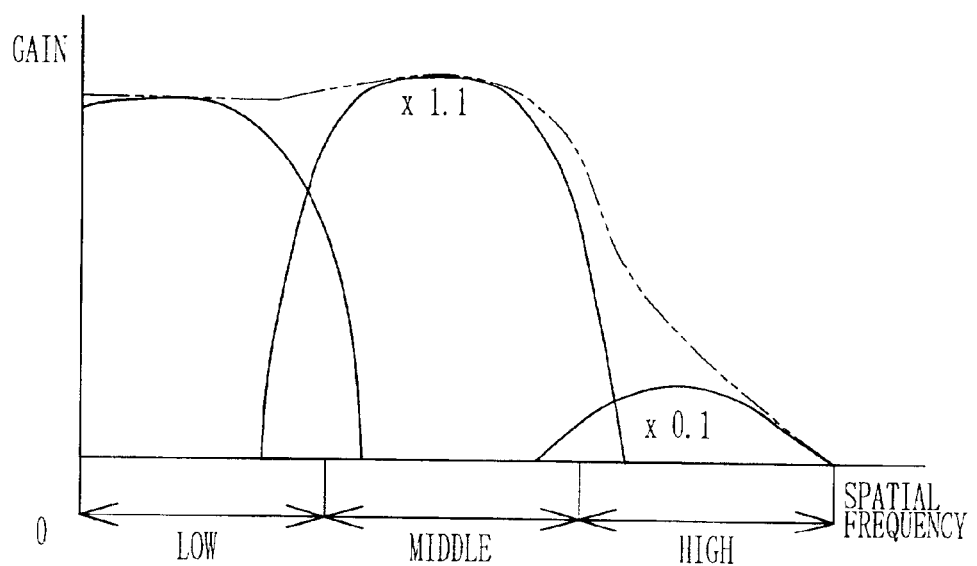
FIG. 6 is a graph illustrating characteristic curves of the first filter of FIG. 5.

As shown in FIG. 5, the first filter 51 is constituted of a low pass filter for the low band 56, a low pass filter for the middle band 57, and amplifiers 58 and 59. As shown in FIG. 6, the image signals entering the first filter 51 are divided into low, middle and high band components through the low pass filters 56 and 57, and then, the gain of the high band components is cut down to 10% through the amplifier 59, and the gain of the middle band components is increased to 110% through the other amplifier 58. These ratio of reducing and raising the gain may be modified appropriately.

Because the spatial frequency of the picked up image data varies depending upon scanning magnification of the reflective scanner and resolving powers in the main and sub scanning directions of the reflective scanner 14, the scanning magnification and the resolving powers of the reflective scanner 14 must be fixed at respectively predetermined constant values when the second mode is selected, for the first filter 51 to operate effectively.

In the third mode, the gain in the high spatial frequency band is still more reduced as compared to the second mode. Thereby, the moiré is eliminated in the largest degree. However, because the gain is reduced also in the middle and low spatial frequency bands, the third mode is selected for those originals which contains grayscale images, or mainly consists of grayscale images. That is, the third mode is suitable for those cases where the quality of grayscale images has the highest priority.

A predetermined sort of imaging software is installed in the personal computer 12, for permitting processing and synthesizing image data. The image correcting section 26 and the image synthesizing section 27 are activated by starting up the imaging software. When the imaging software is started up, a corresponding control screen appears on the monitor 11, so the operator of the imaging system may enter commands in the personal computer 12 in accordance with guidance on the screen. In response to the commands, the image data is sent from the RAM 23 to the image correcting section 26 and the image synthesizing section 27, to be processed therein.

The imaging software includes a variety of imaging mode, e.g. "Digital Camera Index Mode", "Digital Camera Processing-Printing Mode", "Album Mounting Mode", "ID Portrait Mode", "Enlargement Mode" and so forth. These modes may be selected one by one as a service menu, for synthesizing the image by use of a template or print format, or for enlarging or reducing the image.

The "Digital Camera Index Mode" is selected to produce an index print, wherein all of images which are recorded on a storage medium and read out through the card reader 13 are printed on a sheet of recording paper, after being reduced in size and arranged in a matrix. Different kinds of templates are prepared for this mode, and is selected according to the number of images to be contained in an index print.

The "Digital Camera Processing-Printing Mode" is selected when it is necessary to print out hard copies of the processed image data immediately after the image data picked up through a digital camera is processed. In this mode, a template arranging four frames in a matrix is used for a A4 size recording sheet, and a template arranging two frames in combination is used for a A5 size recording sheet.

The "Album Mounting Mode" is for printing a plurality of images on a recording sheet in appropriate layout and arrangement, just like the mounting on an album. So a file of these recording sheets serves directly as an album. Also for this mode, some templates are prepared. For example, there are a template for arranging four images of the same size on one sheet, a template for arranging one large image and two smaller images on one sheet, and a template for arranging a couple of large images on one sheet.

The "Enlargement Mode" is provided for printing an image in a larger size than the original size. For example, an image read out from a A5 size original through the reflective scanner 14 is printed in a A4 size format after converting the magnification.

Figure 7:
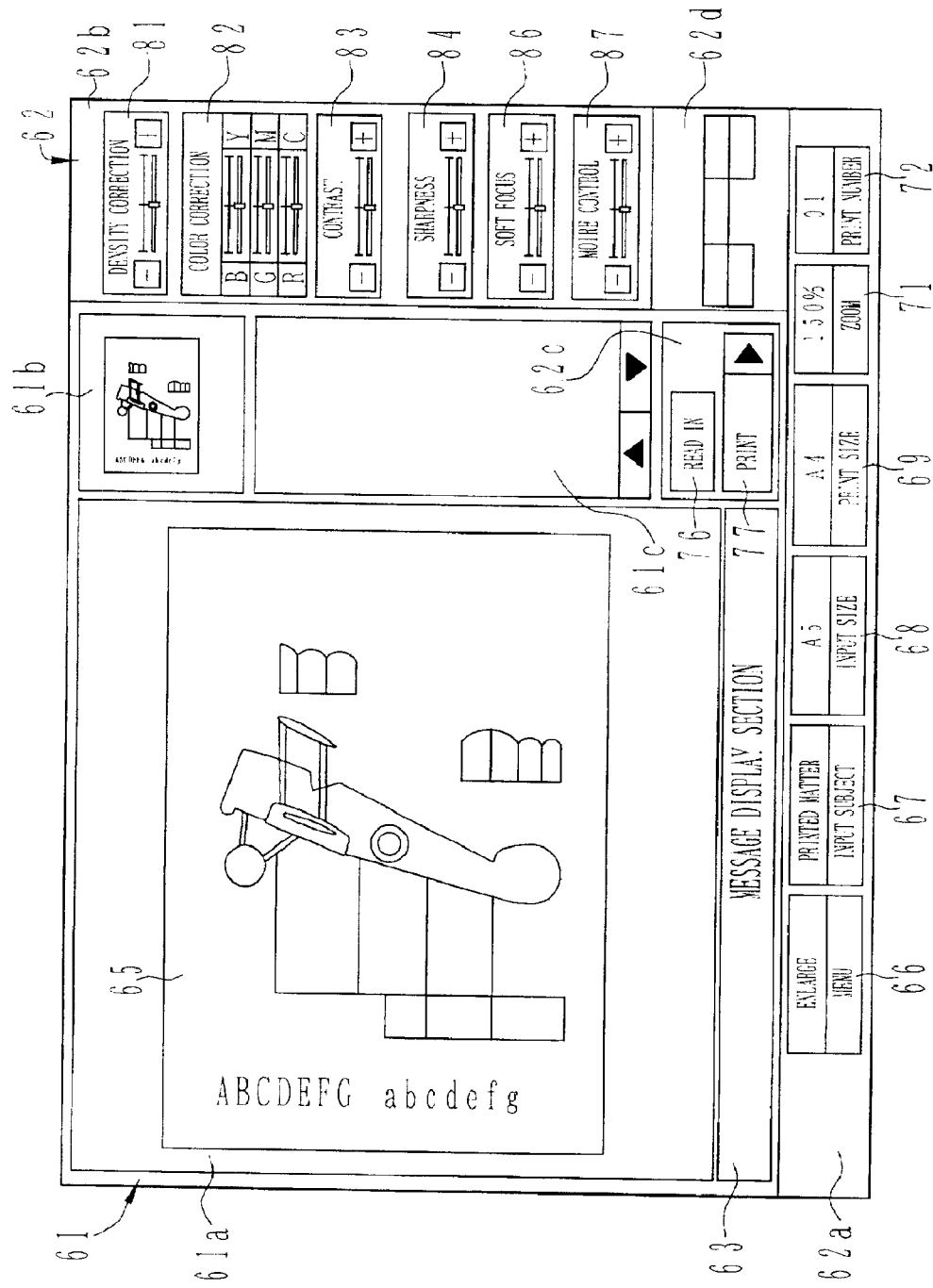
FIG. 7 is an explanatory diagram illustrating an example of screen displayed on a monitor, for processing and printing an image.

FIG. 7 shows an example of control screen displayed on the monitor 11. The control screen is partitioned into an image display area 61 for displaying an image read in the personal computer 12 or an image to print, and a console display area 62 for displaying a console for entering the commands in the personal computer 12. The image display area 61 is divided into a main area 61a, a first sub area 61b and a second sub area 61c.

The second sub area 61c is provided for displaying more than one input image, e.g. three input images, that have been input in the personal computer 12 through the card reader 13 or the film scanner 16. Upon clicking on shift buttons displayed at the bottom of the second sub area 61c with the mouse 32, the displayed image frames are seriatim shifted up or down. Thus, all of a series of input images that are read out from a storage card or a filmstrip may be sequentially observed. However, when the reflective scanner 14 is selected as the image input device, the image read in through the reflective scanner 14 is displayed in the main area 61a, because the reflective scanner 14 can pick up a single image at a time. Accordingly, the second sub area 61c is not used when the reflective scanner 14 is selected as the image input device, as is shown in FIG. 7. The main area 61a also displays an image 65 in an enlarged size, that is selected from among the plurality of input images.

While observing the enlarged image 65, the operator operates the console on the console display area 62 with the mouse 32 or the keyboard 31 for adjusting various parameters of the image. The first sub area 61b is for allowing the operator to see a preview of a printed image, and confirm the size of the image relative to the designated recording paper and the layout of the image on the recording paper before printing.

The console display area 62 is divided into a basic command section 62a, an image control section 62b, an image input-output control section 62c and a subsidiary operating section 62d. Designated by 63 is a message display section for displaying a command to be entered through the keyboard 31 or various messages from the personal computer 12.

The basic command section 62a has a menu selection button 66, an input type selection button 67, an input size designation button 68, a print size designation button 69, a zoom button 71 and a copy number designation button 72 displayed thereon. The menu selection button 66 is for selecting a service menu from among options available in the imaging software. The input subject selection button 67 is for selecting the type of subject from which the image is to read out. For instance, if the image data to input has been picked up through a digital camera, the card reader 13 is selected as the image input device by operating the input type selection button 67. Or if the image data to input is to be read out from a reflective original, such as a printed matter or a photo-print that is printed on an opaque recording material, including a self-developing type film, the reflective scanner 14 is selected as the image input device by operating the input subject selection button 67.

The input size designation button 68 is for designating the size of the original to be scanned through the reflective scanner 14. The print size designation button 69 is for designating the size or format of the recording paper. The zoom button 71 is for designating the magnification of the input image. The copy number designation button 72 is for designating the number of copies to print out.

Upon clicking on one of these buttons 66 to 72 with the mouse 32, a corresponding menu pops up to indicate option items. Then, an appropriate one of the items is selected by clicking on that item in the popped up menu. On the respective buttons 66 to 72, the allocated functions and the selected items are displayed for operator's confirmation.

In the image input-output control section 62c, a read-in button 76 for commanding an image to be read in, and an output button 77 for commanding an image to be printed out or to be output as a file.

The image control section 62b displays a density control box 81, a color control box 82, a contrast control box 83, a sharpness control box 84, a soft focus control box 86 and a moiré control box 87. Each of the control box 81 to 87 has one or more sliders that may slide in one or the other directions by pointing and dragging with the mouse 32, to control the degree of each item. In the subsidiary control section 62d, an image turning button, an image reversing button and other control buttons are displayed, though they are not shown in detail.

In the moiré control box 87, the slider may be switched over between three set values corresponding to the above first to third modes. For example, indicia "1", "2" and "3" are provided at three points along the slider's scale. The operator sets the slider at one of the three points depending upon the content of the original, that is, whether the original mainly contains characters or a grayscale image, or characters and grayscale images are mingled in the original. In accordance with the position of the slider, the selector 54 is switched over to select one of the first to third mode.

It is to be noted that the moiré control box 87 is displayed only when "printed matter" is selected as the original, so that the operator may select one of the first to third modes only when the original is a printed matter. That is, when the original is a photo-print recorded on a photographic paper or an instant photograph recorded on the self-developing type photo film, and thus "photo-print" or "instant film" is selected, the third mode is automatically selected. This is because photo-prints and instant photographs primarily contains grayscale images.

Figure 8:
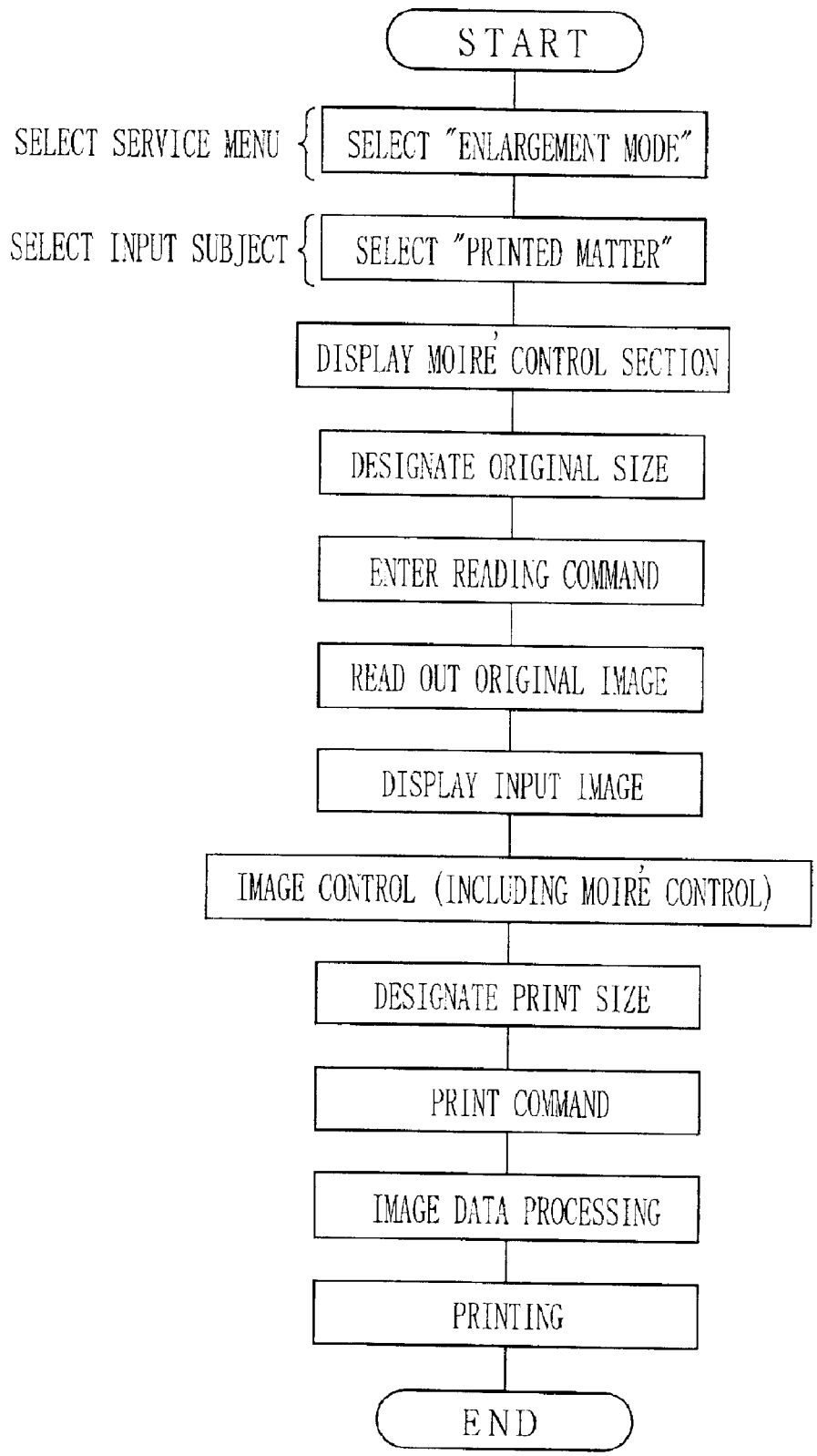
FIG. 8 is a flow chart illustrating an image processing printing sequence of the imaging system.

Now the image processing printing sequence of the above imaging system 10 will be described with reference to the flow chart shown in FIG. 8. To specify the moiré control process, the following description relates to a case where an image to print is picked up from a printed matter through the reflective scanner 14, and is printed in an enlarged size.

First the imaging software is started up, and "Enlargement Mode" is selected by the service menu selection button 66. Thereafter when "printed matter" is selected as the input subject by the input subject selection button 67, the reflective scanner 14 is selected as the input device, and the moiré control box 87 appears on the screen.

The printed matter is placed in the reflective scanner 14, and the size of the printed matter is designated by the input size designation button 68. The read-in button 76 is clicked on to start reading the image by scanning the original through the reflective scanner 14. The reflective scanner 14 outputs image data of the scanned image to the personal computer 12, after filtering the image data through the low pass filter 48. The image input in the personal computer 12 is displayed in the main area 61a in an enlarged size.

The operator adjusts the magnification for the enlargement, or modifies the density, the color and other parameters of the image with reference to the image displayed in the main area 61a. The moiré control mode is selected according to the content of the original image. If the original contains both a grayscale image and characters, as shown for example in the image 65 in FIG. 7, the slider of the moiré control box 87 is set at "2", to select the second mode.

After accomplishing the image control, the print size and the number of print copies are designated, and then the output button 77 is clicked on to enter a print command. Then, the personal computer 12 processes the image data for enlargement in the image synthesizing section 27, and then processes the image data for the density correction or the color correction and the moiré control in the image correcting section 26. The personal computer 12 outputs the processed image data to the printer 18, so the printer 18 prints out the designated number of hard copies of the image in the designated size. Since the image data is output through the first filter 51, moiré is reduced in the grayscale image on the printed hard copy, while the characters are not blurred but reproduced sharply.

If the original contains characters in the main, the slider is set at "1" in the moiré control section 87. Then, the first mode is selected, and the characters are reproduced sharply. For the original containing a grayscale image in the main, the slider is set at "3" in the moiré control section 87. Then, the third mode is selected, and the reproduced grayscale image does not suffer any moiré.

Figure 9:
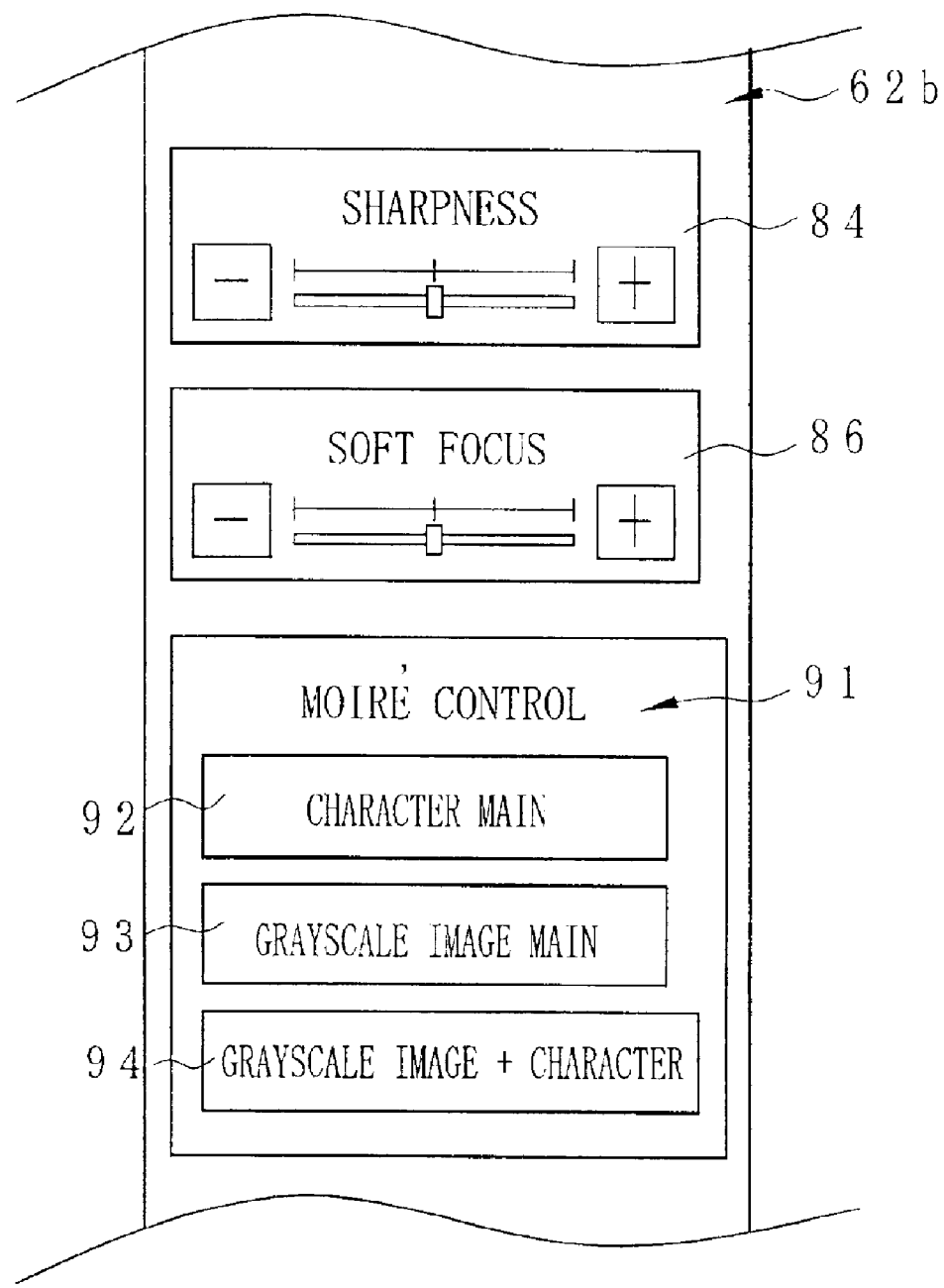
FIG. 9 is an enlarged view of a moiré control box displayed on the monitor, according to a second embodiment of the invention.
Figure 10:
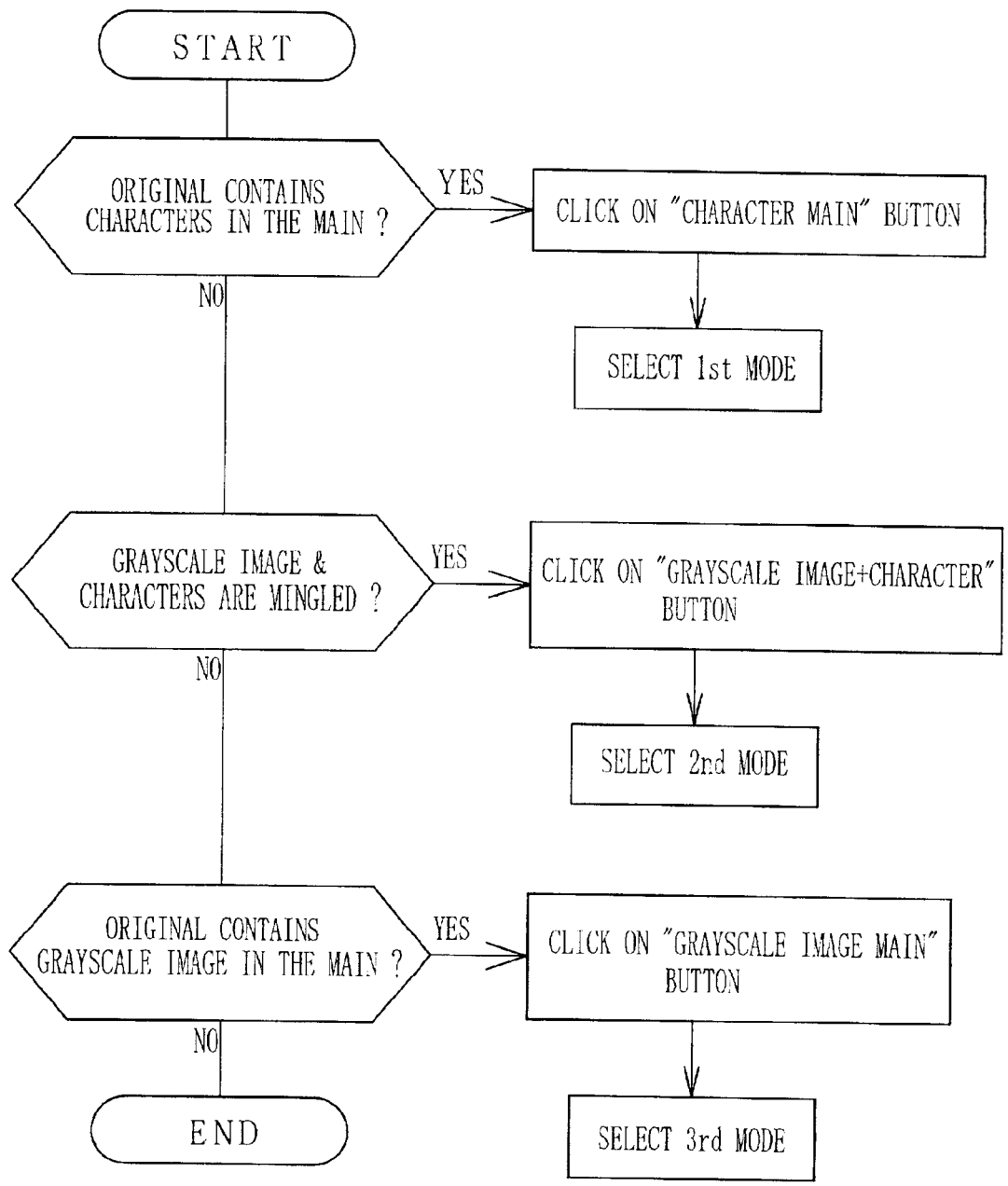
FIG. 10 is a flow chart illustrating a moiré control sequence according to the second embodiment.

The moiré control section 87 in the above embodiment is provided with the slider that is set at one of the three points in accordance with the desirable moiré control mode. According to another embodiment shown in FIG. 9, a moiré control section 91 consists of three buttons 92, 93 and 94 with literal indicia indicating the above-mentioned three different types of original image, i.e. "character main", "grayscale image main" and "grayscale image + character". In this embodiment, the operator has only to click on one of the buttons 92 to 94 in accordance with the content of the original, to select an appropriate one of the first to third mode, as shown in the flow chart of FIG. 10.

In the above embodiment, the read-in magnification of the reflective scanner 14 is fixed when the second mode and thus the first filter 51 are selected for eliminating moiré, for the sake of making full use of the first filter 51. However, it is possible to vary the read-in magnification of the reflective scanner 14 in the second mode. In that case, a plurality of filters having the same characteristic curve as the first filter 51 at different read-in magnifications are prepared, so that one of these filters may be selected according to the designated read-in magnification. Also the resolution of the reflective scanner 14 in the main scan direction is not necessarily be equal to that in the sub scan direction, insofar as a plurality of filters for the second mode are prepared for the different resolutions, although the same resolution is used for both directions in the above embodiment.

As described above, the moiré control may be carried out in one of the first to third modes when "printed matter" is selected as the original, whereas the third mode is automatically selected for other types of original. As an alternative, it is possible to switch over the filters automatically upon designating the type of original. For example, the second mode using the first filter 51 is automatically selected when "printed matter" is designated, whereas the third mode is automatically selected when "photo-print" or "instant photograph" is designated. In this embodiment, when the original is neither a printed matter nor a photo-print including an instant photograph, automatically selecting the third mode is usually preferable, because most of these types of originals contain grayscale images in the main.

It is also possible to prepare a third and more filters than the first and second filters 51 and 52, that have optimum characteristics for eliminating moiré the respective types of originals, such as the printed matter, the photo-print and the instant photograph. In that case, the filters are switched over in accordance with the type of the original.

Although the first filter 51 of the above embodiment boost up the gain of the image signals in the middle spatial frequency band concurrently with knocking down the gain in the high spatial frequency band, it is not always necessary to raise the gain in the middle spatial frequency band.

The printer for use in the imaging system of the present invention is not limited to the heat developing photosensitive material type, but may be a silver halide photography type, a thermal recording type, an ink jet type and so forth.

Thus, the present invention is not to be limited to the above embodiments but, on the contrary, various modifications will be possible to those skilled in the art without departing from the scope of claims attached hereto.

What is claimed is:

1. An image processing method for processing an electronic image that is picked up from an original, comprising the steps of:

selecting, in accordance with content of said original, one of a plurality of filters having different moiré-eliminating characteristics from each other; and filtering said image through said selected filter, wherein said plurality of filters include a first filter and a second filter that eliminates moiré more than said first filter, and wherein said first filter reduces output of high spatial frequency components and also raises output of middle spatial frequency components of an image.

2. An image processing method for processing an electronic image that is picked up from an original, comprising the steps of:

selecting, in accordance with content of said original, one of a plurality of filters having different moiré-eliminating characteristics from each other; and filtering said image through said selected filter, wherein said plurality of filters include a first filter and a second filter that eliminates moiré more than said first filter, and wherein said first filter is selected when said original contains characters and grayscale images, and said second filter is selected when said original mainly contains grayscale images, whereas said first and second filters are not selected when said original mainly contains characters.

3. An image processing method for processing an electronic image that is picked up from an original through a scanner, comprising the steps of:

preparing a plurality of filters that eliminate moiré to different degrees from each other;

entering data on content of said original from which said image is picked up; and automatically selecting one of said plurality of filters in accordance with the content of said original, wherein said plurality of filters include a first filter that reduces output of high spatial frequency components and also raises output of middle spatial frequency components of an image, a second filter that reduces output of high spatial frequency components of an image to a larger degree than said first filter and also reduces output of middle spatial frequency components of the image, and a third filter that reduces output of high spatial frequency components of an image to a smaller degree than said first filter.

4. An image processing method as recited in claim 3, wherein said first filter is selected when said original contains characters and grayscale images, and said second filter is selected when said original mainly contains grayscale images, whereas said third filter is selected when said original mainly contains characters.

5. An image processing method for processing an electronic image that is picked up from an original through a scanner, comprising the steps of:

preparing a plurality of filters that eliminate moiré to different degrees from each other;

entering data on a type of said original from which said image is picked up;

automatically selecting one of said plurality of filters in accordance with the type of said original; and filtering said image through said selected filter, wherein the type of said original includes a printed matter, a photo-print and an instant photograph as reflective originals which are printed on opaque recording materials and reflect light.

6. An image processing method for processing an electronic image that is picked up from an original through a scanner, comprising the steps of:

preparing a plurality of filters that eliminate moiré to different degrees from each other;

entering data on a type of said original from which said image is picked up;

automatically selecting one of said plurality of filters in accordance with the type of said original; and filtering said image through said selected filter, wherein the type of said original is classified according to coloring materials used in said original.

* * * * *